United States Patent Office 3,476,727
Patented Nov. 4, 1969

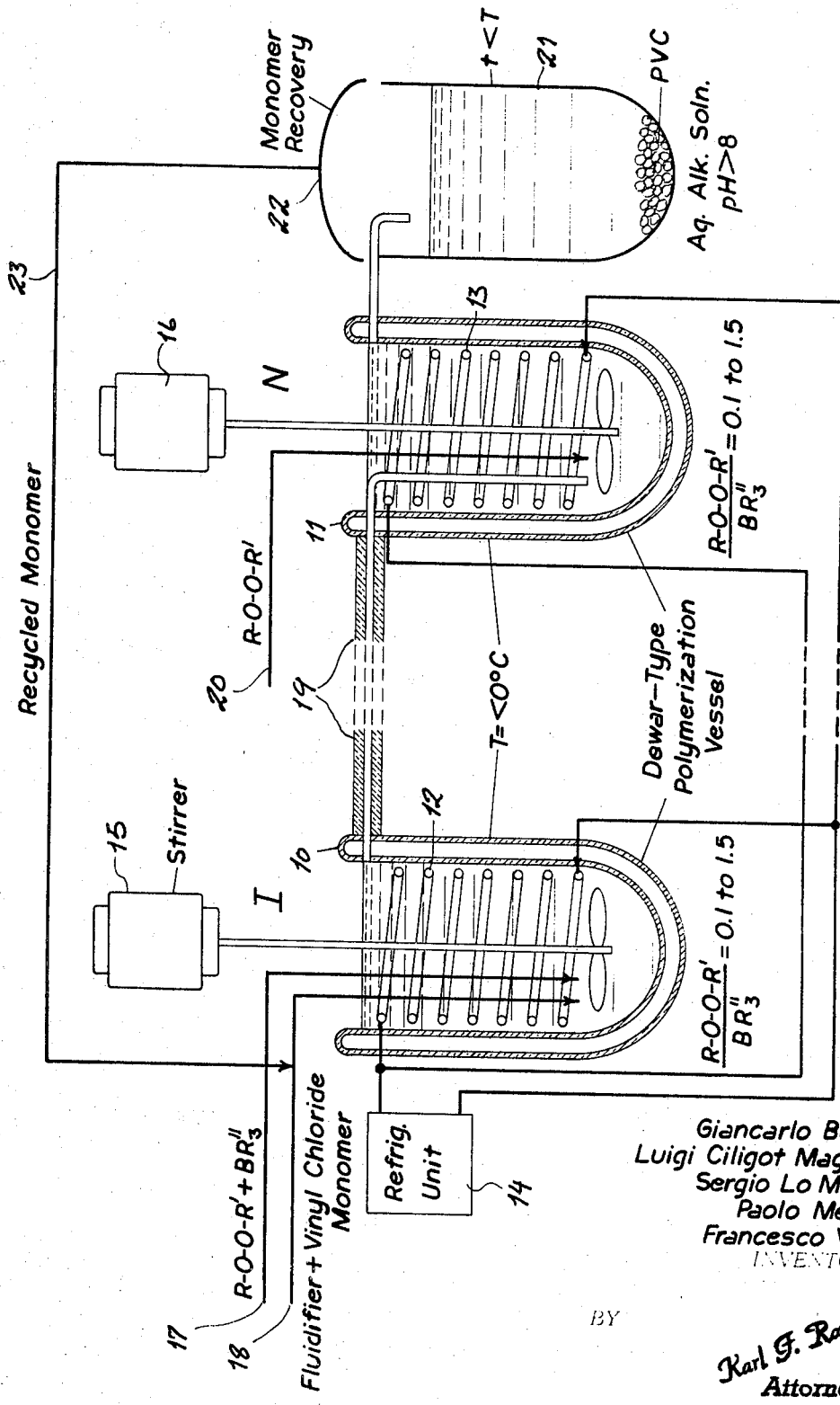

3,476,727
PROCESS FOR THE LOW-TEMPERATURE HOMO-POLYMERIZATION AND COPOLYMERIZATION OF VINYL CHLORIDE
Sergio Lo Monaco and Paolo Melacini, Mestre, Giancarlo Borsini, Luigi Ciligot Magagnin, and Francesco Visani, Milan, Italy, assignors, by mesne assignments, to Chatillon Societa Anonima Italiana per le Fibre Tessili Artificiali S.p.A., Milan, Italy, a corporation of Italy
Filed Dec. 19, 1966, Ser. No. 602,902
Claims priority, application Italy, Dec. 17, 1965, 28,027/65
Int. Cl. C08f 3/30, 1/62
U.S. Cl. 260—92.8
10 Claims

ABSTRACT OF THE DISCLOSURE

Process for the production of homopolymers of vinyl chloride and copolymers of vinyl chloride with vinyl monomers copolymerizable therewith (e.g. vinyl acetate), where the monomeric compound is passed continuously through a plurality of polymerization stages maintained at a polymerization temperature below 0° C. (preferably from $-15°$ to $-69°$) with an organoboron catalyst and an organic peroxide activator of the general formula R—O—O—R' wherein R and R' are the same or different from one another, at least one being an organic radical, and selected from hydrogen, alkyl, aryl, cycloalkyl and aralkyl radicals (e.g. cumene hydroperoxide or tert-butyl hydroperoxide). The molar ratio R—O—O—R'/BR"$_3$, wherein BR"$_3$ represent organoboron compound, being less than 1.5 and preferably 0.1 to 1 in the reactors or stages prior to the terminal stage and being 1.5 to 5, preferably from 2 to 3, in the terminal reactor.

SPECIFICATION

Our present invention relates to the production of homo- and copolymers of vinyl chloride at low temperatures and, more particularly, to a method of polymerizing vinyl chloride (as the sole member of the monomeric component or in association with a minor fraction or another vinylic monomer copolymerizable therewith (e.g. vinyl acetate) whereby a high quality colorless or white product, particularly suitable for use in filaments, is obtained.

It has become common knowledge in the vinyl-polymer field that high-quality vinyl chloride polymers with high syndiotactic index and stereoregularity can be obtained by the low-temperature polymerization of vinyl chloride. It has also been found, however, that subsequent treatment of the vinyl-chloride polymers obtained from low-temperature polymerization and conducted at somewhat higher temperatures gives rise to a postpolymerization of residual monomers (i.e. monomers trapped, dissolved or absorbed in the polymer) to such an extent that the vinyl product is discolored, has a greatly reduced syndiotactic index and may be unsuitable for use in filaments. This postpolymerization phenomenon appears to be due to the presence in the reaction mixture or the polymer itself of residual quantities of a catalyst which, while no longer effective at the low polymerization temperature, is active at higher temperatures to postpolymerize residual monomer. Since the polymerization rate increases sharply as a function of temperature, the amount of the postpolymerization product may be considerable.

To obviate these disadvantages, it has been proposed to carry out subsequent treatment steps at low temperatures or to effect rapid separation of the reactive components. These processes are inordinately complex, are difficult to control and are characterized by the incorporation of oxygen in the recovered residual vinyl-chloride monomer to render it nonrecyclable or thereby increase the cost of the process.

It is the principal object of the present invention to provide an improved process for the low-temperature polymerization of vinyl chloride whereby the aforementioned disadvantages can be avoided and aftertreatment of the polymer carried out at relatively high temperatures without significant postpolymerization.

Another object of this invention is to provide a method of polymerizing vinyl chloride to yield polymers particularly suitable for use in filaments or fibers and having high syndiotactic index, good stereoregularity, high uniformity and a substantially white or colorless appearance.

We have now discovered that it is possible to overcome the above-mentioned disadvantages by a process for the polymerization of vinyl chloride which is carried out at temperatures below 0° C. and preferably between $-15°$ C. and $-60°$ C. with organometallic boron derivatives serving as the catalyst, when the process is carried out continuously in two or more discrete stages and the catalyst is activated by an organic peroxide (preferably an organic hydroperoxide) of the general formula R—O—O—R' wherein R and R' may be the same or different, at least one being an organic radical, the radicals R and R' being selected from the group of hydrogen, alkyl, aryl, cycloalkyl and aralkyl radicals. The molar ratio of the activator to the organoboron compound, according to this invention, is different at least in the first and last stages of the reaction and higher in the last stage of the reaction than in the first; the effluent from the last reaction is then treated at a temperature above that of the last polymerization stage with an aqueous alkaline solution to recover the polymer.

Surprisingly, the present method permits of subsequent treatments of the polymer (i.e. after the last polymerization stage) at relatively elevated temperatures without appreciable postpolymerization. There is no need, therefore, to use intricate operative methods or low-temperature recovery steps, and, moreover, the polymerized product has qualities approaching or exceeding those of the best low-temperature polymers. The product has a high syndiotactic index and a molecular weight, color and physical characteristics which enable it to be used in the production of synthetic fibers by conventional techniques; moreover, other characteristics of the product, namely, the lack of shrinkage of the polymer in boiling water and the absence of any significant shrinkage in trichloroethylene (at 40° C.) are significant in enabling the polymer to be spun into or incorporated in fibers for the production of fabrics.

The organoboron catalyst according to the present invention may be any of those conventionally used as electron-receptive boron-based compounds for the polymerization of vinyl chloride and include alkyl borons (alkyl group having a carbon number less than 8), boron hydrides, boron alkyl hydrides (alkyl group having a carbon number from 1 to 8) alone or in complexes with electron-donor compounds (e.g. oxygenated compounds such as ethers; nitrogen compounds such as ammonia, amines, etc.). Best results are obtained with boron trialkyls (BR"$_3$) wherein R" is an alkyl group having 2 to 4 carbon atoms. Such compounds include triethyl boron, tri-n-propyl boron and tri-n-butyl boron alone or as complexes with methylethyl ether, dioxane and tetrahydrofurane; the organoboron compounds and complexes may be used in amounts ranging from 0.005 to 3 parts by weight per 100 parts by weight of the monomeric components.

The monomeric component, moreover, may consist entirely of monomeric vinyl chloride or, when copolymers are desired, of a major portion of vinyl chloride and a minor proportion of one or more monomers copolymerizable therewith. A minor proportion may include up to 20% by weight of, for example, vinyl acetate.

The polymerization temperature may, as indicated, range from 0° C. to −80° C. although temperatures below −15° C. and preferably from −20° to −60° C. have been found most effective.

The peroxide-type catalyst activator, having the general formula R—O—O—R' may be an aliphatic or aromatic hydroperoxide having a carbon number in the R or R' group up to 10. It has been found that alkyl-aryl and alkyl-hydroperoxide, especially tert-butyl hydroperoxide and cumene hydroperoxide are most effective. The ratio of the organic peroxide to the organoboron catalyst component will vary from the first reactor to the last and should be from 0.1 to 1 (in molar terms) in the first reaction stage and, if more than two are provided, in all of the reaction stages but the last; the molar ratio of the organic peroxide to the organoboron compound is preferably in excess of 1.5 (usually from 2 to 3) in the last reactor. Under these circumstances, the organoperoxide compound is present in the last reactor in an amount above that necessary to activate (as an electron donor) the organometallic boron compound. While we do not wish to be limited to any theory in this regard, it appears that the excess of the peroxide-type compound stabilizes the reaction mass against post-polymerization, this being evident from the fact that increase of the temperature of the reaction mixture upon its introduction into a bath of aqueous alkali at a much higher temperature will not give rise to postpolymerization.

According to a further feature of this invention, the reaction may be carried out in the presence of one or more fluidizing agents capable of maintaining the fluidity of the reaction mass even at high conversions to the polymer. This increases the yield and decreases the rate of catalyst consumption. Fluidizing agents in accordance with this invention include aliphatic halogen derivatives, especially ethyl chloride, dichloroethane, methyl chloride and methylene chloride.

Upon emerging from the last reaction stage, the mixture is continuously subjected to treatment with an aqueous alkaline solution at a pH in excess of 8 and containing alkali-metal or alkaline-earth metal-soluble basic salts and hydroxides, preferably alkaline-earth metal and alkali-metal compounds containing a surfactant group. Best results are obtained when the aqueous solution contains between 0.1 and 10 grams of the alkaline compound per liter of solution. The compounds can most effectively be chosen from the group of sodium hydroxide, sodium carbonate, sodium phosphate and sodium laurate.

The reaction mixture continuously supplied to the first reactor preferably contains 0.01 to 0.5 part of the organoboron catalyst per 100 parts of vinyl chloride monomer, 20 to 40 parts of the fluidizing agent per 100 parts of vinyl chloride monomer, all parts by weight, and sufficient organoperoxide to ensure an $$R—O—O—R'/BR''_3$$

molar ratio of less than 1 (preferably 0.4). The polymerization temperature is held in the first reactor at a constant level between −20° C. and −60° C. The effluent from this first reactor is delivered to a second reactor, or, after a series of reaction stages, to a final reactor to which sufficient peroxide is added to raise the molar ratio above 1.5. The reaction mixture is then discharged from the last reactor into an aqueous alkaline solution (pH above 8) at a temperature of 10° to 30° C. The excess monomer evaporates and is returned to the input side of the system for reuse. The alkaline solution likewise can be reused after separation of the polymer therefrom.

The above and other objects, features and advantages of the present invention will become readily apparent from the following description, reference being made to the subsequent examples and the accompanying drawing, the sole figure of which diagrammatically represents a system for the continuous polymerization of vinyl chloride in accordance with our invention.

In the drawing, we show two vessels 10 and 11, representative of a series of low-temperature polymerization reactors carrying out respective stages I . . . N of a continuous polymerization reaction. Each of the reactors is provided with cooling means such as a coil 12, 13 connected to a refrigeration unit 14 adapted to hold the temperature at a constant level within the desired reaction range (i.e. −20° to −60° C.). A stirrer 15, 16 provides constant-rate agitation while inlet means 17 and 18 are provided at the first stage I for delivering to the reactor the vinyl-chloride monomer, fluidifier, organoperoxide activator and organoboron catalyst. The effluent from the first Dewar-type polymerization reactor 10 is carried by an insulated line 19 (without increase in temperature) to the second or final reactor 11 to which additional organoperoxide is fed by line 20. The effluent from this latter reactor, in turn, is deposited in an aqueous alkali solution (vessel 21) in which the temperature $t$ is greater than the polymerization temperature T. Evaporated monomer is recovered as represented at 22 and after condensation etc. is returned as represented by line 23 to the vinyl-chloride input side of the system.

EXAMPLE I

Batch polymerization (ROOR'/BR''$_3$=2)

Into a glass polymerization reactor, previously cooled to −40° C., having a capacity of 2 liters and fitted with a stirrer, a refrigerating system, thermometer and means for feeding the reactants, were introduced:

| | Grams |
|---|---|
| Monomeric vinyl chloride | 1500 |
| Cumene hydroperoxide (CHP) | 0.7 |
| Triethylboron (BEt$_3$) | 0.225 |

(molar ratio CHP/BEt$_3$=2). The contents of the reactor were then subjected to polymerization at a temperature maintained strictly constant at −40° C.

At intervals of 15 minutes, samples of the polymerized mixture were drawn from the reactor and the degree of conversion for each sample was determined (expressed as weight percent of vinyl chloride monomer transformed into polyvinyl chloride).

In Table 1 the conversions are recorded with reference to the reaction time:

TABLE 1

| Polymerization time: | Conversion in percent |
|---|---|
| 15 minutes | 0.85 |
| 30 minutes | 0.95 |
| 45 minutes | 1.0 |
| 60 minutes | 1.1 |
| 90 minutes | 1.1 |
| 120 minutes | 1.1 |

From the values recorded in Table 1 it will be seen that after 60 minutes the reaction mass is practically no longer polymerizable at the temperature of −40° C.

Furthermore, a sample of the polymerized mixture, withdrawn after 120 minutes, was put into a vessel containing an aqueous solution of 0.2% NaOH at 30° C. The polymer was then recovered and the residual monomer was evaporated therefrom.

Thereupon the polymer was centrifuged, dried and then dissolved in cyclohexanone (18% concentration, temperature=135° C.) and then, according to ASTM Standard 1958 part VIII, pages 360–361, the Gardner color value of the solution was determined; the color value corresponded to the first degree of the Gardner scale.

The monomer thus separated by evaporation, even if brought to high temperatures (e.g. 50° C.), did not give rise to any further polymerization.

The polymer was particularly suited for the manufacture of white or colorless synthetic fibers.

EXAMPLE Ia

Batch polymerization (ROOR'/BR"$_3$=0.66)

The polymerization tests were repeated with a mixture cooled down to −40° C. and of the following composition:

|  | Grams |
|---|---|
| Monomeric vinyl chloride | 1500 |
| Cumene hydroperoxide | 0.233 |
| Triethylboron | 0.225 |

(molar ratio CHP/BEt$_3$=0.66).

At intervals of 15 minutes, samples of the polymerized mixture were withdrawn from the reactor and the degree of conversion of each sample was determined (expressed as percent of vinyl chloride transformed into polyvinyl chloride).

In the following Table 2 all the conversion values are recorded in percentages with respect to the reaction time:

TABLE 2

| Polymerization time: | Conversion, percent |
|---|---|
| 15 minutes | 1.5 |
| 30 minutes | 2 |
| 45 minutes | 2.6 |
| 60 minutes | 3.2 |
| 90 minutes | 4.1 |
| 120 minutes | 5.25 |

Using the above-described procedure, it was found that the Gardner color value of the polymer thus obtained was equal to the 12th degree of the Gardner scale, and the polymer could not be used in the preparation of white or colorless synthetic fibers.

At the same time the extracted monomer apparently polymerized further, even at temperatures lower than 30° C.; the quality of the product polymer was seriously compromised in the subsequent treatment because of post-polymerization phenomena due to the presence of residual monomer in the polymerization mass, which was not stabilized against post-polymerization.

EXAMPLE II

Batch Polymerization (ROOR'/BR"$_3$=3)

Using the apparatus and method described above, polymerization was carried out at −30° C. with a mixture of the following composition:

|  | Grams |
|---|---|
| Monomeric vinyl chloride | 1500 |
| Cumene hydroperoxide | 0.525 |
| Triethylboron | 0.1125 |

(molar ratio of cumene hydroperoxide/triethylboron=3).

At time intervals of 15 minutes samples of polymerized mixture were withdrawn in order to determine the degree of conversion.

In Table 3 the degree of conversion is recorded for each sample in relation to the reaction time.

TABLE 3

| Polymerization time: | Conversion, percent |
|---|---|
| 15 minutes | 2.3 |
| 30 minutes | 2.45 |
| 45 minutes | 2.5 |
| 60 minutes | 2.5 |
| 90 minutes | 2.5 |
| 120 minutes | 2.5 |

From this data it can be seen how, after only 45 minutes, the reaction mass was practically no longer polymerizable at the temperature of −30° C.

Furthermore, a sample of the polymerization mixture, recovered after 120 minutes, was poured into a vessel containing 0.2% aqueous NaOH at 30° C. The polymer was then recovered while the monomer evaporated.

The polymer was then centrifuged, dried and then dissolved in cyclohexanone and the Gardner color value of the resulting solution determined according to ASTM Standard 1958, part VIII, pp. 360–361. The color value corresponded to the first degree of the Gardner scale. The polymer may thus be used for the manufacture of white or colorless synthetic fibers.

The monomer recovered by evaporation from the polymer, even when brought to relatively high temperatures (50° C.) did not give rise to any polymerization.

Example IIa

Batch polymerization (ROOR'/BR"$_3$=0.5)

The polymerization tests of Example II were repeated with a mixture consisting of:

|  | Grams |
|---|---|
| Monomeric vinyl chloride | 1500 |
| Cumene hydroperoxide | 0.0875 |
| Triethylboron | 0.1125 |

(Molar ratio CHP/BEt$_3$=0.5)

In the following Table 4 the conversion degrees of samples withdrawn at fifteen-minute intervals are recorded in relation to the polymerization time:

TABLE 4

| Polymerization time: | Percent conversion |
|---|---|
| 15 minutes | 1.5 |
| 30 minutes | 2.5 |
| 45 minutes | 3.5 |
| 60 minutes | 4.5 |
| 90 minutes | 6.4 |
| 120 minutes | 8.5 |

From these conversion values it is evident that the conversion increases continuously with polymerization time.

Furthermore, a sample of the polymerization mixture, put into a vessel containing an aqueous solution of 0.2% soda and subjected to the above-described treatment, gave rise to a polymer with a Gardner color-scale value=12 and to a monomer which, at temperatures below 30° C. demonstrated post-polymerization capabilities.

EXAMPLE III

Continuous polymerization (two stage)

The polymerization was carried out in a continuous manner in two reactors (similar to that described in Example I) arranged in series, both having a useful capacity of 2 liters.

Into the first reactor, previously cooled to −25° C., the following substances were fed continuously:

| Monomer vinyl chloride | grams/minute | 16 |
|---|---|---|
| Cumene hydroperoxide | do | 0.0104 |
| Triethylboron | do | 0.0192 |

(Molar ratio CHP/BEt$_3$=0.35 in the first reactor)

The reactants were supplied at a rate sufficient to ensure a complete volume renewal of the reactor after 120 minutes.

Into the second reactor, receiving the effluent from the first, cumene hydroperoxide was continuously fed at a rate of 0.0493 gram/minute (above that carried over from the first reactor) so as to obtain a molar ratio CHP/BEt$_3$=2:1 (with respect to the BEt$_3$ fed into the first reactor).

At intervals of 30 minutes, samples of polymerized mixture were drawn from both reactors in order to establish the degree of conversion. In Table V the conversion values of the two reactors are recorded with respect to the polymerization time.

TABLE 5

| Polymerization time (min.) | Percent conversion in 1st reactor | Percent conversion in 2nd reactor |
| --- | --- | --- |
| 30 | 1.75 | |
| 60 | 2.40 | |
| 90 | 2.85 | |
| 120 | 3.40 | |
| 150 | 3.75 | |
| 180 | 4 | |
| 210 | 4.15 | |
| 240 | 4.25 | 9.3 |
| 270 | 4.2 | 9.3 |
| 300 | 4.2 | 9.3 |
| 330 | 4.2 | 9.3 |
| 360 | 4.2 | 9.3 |
| 390 | 4.2 | 9.3 |
| 420 | 4.2 | 9.3 |
| 450 | 4.2 | 9.3 |
| 480 | 4.2 | 9.3 |

From the recorded values it will be seen that in the second reactor the degree of polymerization was considerably higher than that present in the first reactor and constant at 9.3%. From both reactors, polymer samples were withdrawn and treated as previously indicated. It was found that, while from the first reactor polymers were obtained with a Gardner color value=12 and monomers which were still polymerizable (at temperatures greater than —25° C.), the samples drawn from the second reactor and similarly tested had a Gardner color value =1. Furthermore, the monomer recovered by evaporation was not susceptible to further polymerization even when brought to high temperatures (e.g. 50° C.).

EXAMPLE IV

Continuous polymerization (two stage)

Polmerization was carried out continuously in two reactors connected in series and each having a useful capacity of 2 liters.

In the first reactor, previously cooled to —40° C., the following substances were continuously supplied:

Monomeric vinyl chloride _____grams/min__ 11.2
Ethyl chloride (fluidifying agent) _____do____ 4.8
Cumene hydroperoxide _____do____ 0.00397
Triethylboron _____do____ 0.00728
(first reactor molar ratio CHP/BEt$_3$=0.35).

The reactants were supplied so as to obtain a complete renewal of the contents of the reactor after 120 minutes.

The effluent of the first reactor was continuously fed to the second reactor together with an additional quantity of cumene hydroperoxide equal to 0.01903 gram/minute, so as to maintain therein a molor ratio CHP/BEt$_3$ (with reference to the BEt$_3$ carried over from the first reactor) equal to 2:1. At intervals of 30 minutes from the two reactors samples of polymerized mixture were withdrawn in order to determine the degree of conversion. In the following Table 6 the degree of conversion, calculated with respect to the time of polymerization, is recorded for each of the samples.

TABLE 6

| Polymerization time (min.) | Percent conversion in 1st reactor | Percent conversion in 2nd reactor |
| --- | --- | --- |
| 30 | 0.9 | |
| 60 | 1.45 | |
| 90 | 1.9 | |
| 120 | 2.15 | |
| 150 | 2.4 | |
| 180 | 2.55 | |
| 210 | 2.65 | |
| 240 | 2.80 | |
| 270 | 2.90 | |
| 300 | 3 | 6.3 |
| 330 | 3.2 | 6.3 |
| 360 | 3.2 | 6.3 |
| 390 | 3.2 | 6.3 |
| 420 | 3.2 | 6.3 |
| 450 | 3.2 | 6.3 |
| 480 | 3.2 | 6.3 |

From these values it will be seen that in the second reactor the degree of polymerization was considerably greater than that of the first reactor and it was constant at 6.3%.

The reduction in conversion that is observed in comparison with that of the preceding example was due to the presence of the fluidifying agent (ethyl chloride) which permitted, however, superior control of the reaction by continuous agitation of the reaction mass. Samples of polymer withdrawn from each of the two reactors and treated as previously described were evaluated. From the first reactor polymers were obtained with a high Gardner color value (12) and monomers still capable of polymerizing at temperatures higher than —40° C., the samples drawn from the second reactor had a Gardner color-scale value of 1. Furthermore, the monomer recovered by evaporation was not capable of polymerizing, even when brought to high temperatures (e.g. 50° C.).

EXAMPLE V

Continuous polymerization

Polymerization was carried out by the continuous method in two reactors in series, both having a capacity of 2 liters and being similar to those of the preceding Examples.

The following substances were continuously fed into the first reactor, previously cooled to —35° C.

Monomeric vinyl chloride _____grams/min__ 16
Cumene hydroperoxide _____do____ 0.0104
Triethylboron _____do____ 0.0192
Ethyl ether (fluidifying agent) _____do____ 0.0139 so as to obtain in the first reactor a molar ratio $$CHP/BEt_3 \cdot Et_2O = 0.35$$

The components were supplied in such manner as to ensure a complete renewal of the contents of the reactor after 120 minutes.

An additional quantity of cumene hydroperoxide equal to 0.0493 gram/min. was continuously fed to the second reactor, together with the effluent reaction mixture from the first reactor so as to obtain a molar ratio $$CHP/BEt_3 \cdot Et_2O$$

(with respect to the BEt$_3 \cdot$Et$_2$O fed into the first reactor) of 2:1.

At intervals of 30 minutes, samples of the polymerized mixture were drawn from the reactors in order to ascertain the conversion degree.

In Table 7 the degree of conversion is recorded for each sample from the two reactors in terms of the polymerization time.

TABLE 7

| Polymerization time (min.) | Percent conversion in 1st reactor | Percent conversion in 2nd reactor |
| --- | --- | --- |
| 30 | 1.5 | |
| 60 | 2.3 | |
| 90 | 2.65 | |
| 120 | 3.10 | |
| 150 | 3.40 | |
| 180 | 3.80 | |
| 210 | 3.90 | |
| 240 | 4.15 | 8.5 |
| 270 | 4.20 | 8.5 |
| 300 | 4.20 | 8.5 |
| 330 | 4.20 | 4.5 |
| 360 | 4.20 | 8.5 |
| 390 | 4.20 | 8.5 |
| 420 | 4.20 | 8.5 |
| 450 | 4.20 | 8.5 |
| 480 | 4.20 | 8.5 |

From these values it will be seen that in the second reactor the degree of polymerization was considerably higher than that of the first reactor, but constant at 8.5%.

From both reactors, samples of the polymer were withdrawn and treated as previously described; it was found that polymers from the first reactor had a Gardner color-scale value of 12 and yielded monomers capable of being "post-polymerized" at temperatures higher than —35° C. The samples drawn from the second reactor had a Gardner color-scale value of 1. Furthermore, the monomer recovered from these samples by evaporation was not capable of polymerization even when raised to a temperature of 50° C.

EXAMPLE VI

Continuous polymerization

Polymerization was carried out by the continuous method in two reactors connected in series, both having a useful capacity of 2 liters, the reactors being similar to those of the preceding examples.

The following substances were continuously fed into the first reactor, previously cooled to −35° C.:

| | |
|---|---|
| Monomeric vinyl chloride _____grams/min__ | 16 |
| Tertiary butylhydroperoxide (TBH) ___do____ | 0.00613 |
| Triethyl boron (BEt$_3$) _____do____ | 0.0192 |
| Ethyl ether (Et$_2$O) _____do____ | 0.0139 | so as to obtain in the first reactor a molar ratio $$TBH/BEt_3Et_2O = 0.35$$

The input was such as to achieve a complete replacement of the volume of the reactor after 120 minutes.

At the same time an amount of tertiary butylhydroperoxide equal to 0.02908 gram/min. was continuously combined with the reaction mixture from the first reactor in the second reactor so as to obtain therein a molar ratio TBH/BEt$_3$·Et$_2$O (with respect to the BET$_3$ fed to the first reactor) of 2:1.

Samples of polymerized mixture were withdrawn at intervals of 30 minutes from the two reactors in order to determine the degree of conversion.

In Table 8 the conversion degree of each sample is recorded with reference to the reaction time:

TABLE 8

| Polymerization time (min.) | Percent conversion in 1st reactor | Percent conversion in 2nd reactor |
|---|---|---|
| 0 | 1.4 | |
| 0 | 2.2 | |
| 0 | 2.55 | |
| 20 | 3.05 | |
| 50 | 3.30 | |
| 80 | 3.70 | |
| 10 | 3.85 | |
| 40 | 4.15 | 8.2 |
| 70 | 4.15 | 8.2 |
| 00 | 4.15 | 8.2 |
| 30 | 4.15 | 8.2 |
| 60 | 4.15 | 8.2 |
| 90 | 4.15 | 8.2 |
| 20 | 4.15 | 8.2 |
| 50 | 4.15 | 8.2 |
| 80 | 4.15 | 8.2 |

From these values it will be seen that in the second reactor the degree of polymerization was considerably higher than that found in the first reactor, and constant at 8.2%.

As in the preceding examples, samples of polymer were withdrawn both from the first as well as from the second reactor and were treated in the manner previously described. It was observed that, from the first reactor, polymers were obtained with a Gardner color-scale value of 12 and yielded monomers capable of polymerization at temperatures higher than −35° C.; the samples drawn from the second reactor had a Gardner color value of 1. Furthermore, the residual monomer recovered from these samples by evaporation was not capable of being polymerized even when brought to higher temperature (e.g. 50° C.).

When tripropyl boron and tributyl boron were substituted for the catalyst of Example VI, in the same quantity, essentially equivalent results were obtained.

The fluidizing agent of Example V was also replaced, again with essentially similar results, by dichloroethane, methylchloride and methylene chloride.

Aqueous solutions of sodium carbonate, sodium phosphate and sodium laurate (about 0.1 to 10 grams per liter of solution) were used effectively in Examples V and VI in place of the sodium hydroxide solutions there described.

In Examples V and VI, moreover, it was possible to substitute a monomeric component consisting of 80% vinyl chloride and 20% (by weight) vinyl acetate for the monomeric vinyl chloride components set forth therein.

In place of the ether, see Example VI, it was possible to use effectively dioxane and tetrahydrofurane.

We claim:

1. In a process for the polymerization of a monomeric component consisting predominantly of vinylchloride wherein the polymerization is carried out at a temperature below 0° C. with an organoboron catalyst and an organoperoxide activator of the general formula R—O—O—R', wherein R and R' are the same or different, at least one of R and R' being an organic radical selected from the group which consists of alkyl, aryl, cycloalkyl, and aralkyl radicals and the other is selected from the group which consists of hydrogen, alkyl, aryl, cycloalkyl, and aralkyl radicals, the improvement wherein the polymerization is carried out initially with a molar ratio of said organoperoxide activator to said organoboron catalyst of less than 1.5 but sufficient to effect a substantial degree of polymerization of said component; and, after the attainment of said substantial degree of polymerization, said molar ratio is increased to a level of substantially 1.5 to 5 and the polymerization reaction is terminated with said molar ratio at said level.

2. The improvement defined in claim 1 wherein said organboron catalyst is selected from the group which consists of boron alkyl, boron alkylhydride and boron hydride compounds alone or complexed with electron-donor compounds.

3. The improvement defined in claim 2 wherein said process further includes the step of treating the reaction mixture upon termination of the polymerization reaction at a temperature above the polymerization temperature and of about 10° C. to 30° C. at termination with an aqueous alkaline solution having a pH of at least 8 to drive off the monomer rapidly by evaporation and enable recovery of the polymer from said reaction mixture thus freed from the monomer.

4. The improvement defined in claim 3 wherein the polymerization reaction is carried out in at least two successive stages, said monomeric component being continuously supplied to a first reactor stage together with said organoboron catalyst and said organoperoxide activator for said initial polymerization, an effluent mixture from the first reactor stage being passed into at least one subsequent reactor stage while the polymerization of the monomeric component continues therein at a temperature below 0° C., a further quantity of the organoperoxide activator being added to said effluent mixture in said subsequent reactor stage to bring said molor ratio to said level, the reaction mixture from said subsequent reactor stage being continuously treated with said aqueous alkaline solution.

5. The improvement defined in claim 4 wherein said molar ratio ranges between 0.1 and 1 in each reactor stage but the last and is between substantially 2 and 3 in the last reactor stage.

6. The improvement defined in claim 4 wherein the reaction mixture in each of said stages includes a fluidifying agent for increasing the fluidity of the reaction mixture, said organo boron catalyst being present in said first reactor stage in an amount ranging between substantially 0.005 and 3 parts by weight per 100 parts by weight of said monomeric compound, said fluidifying agent being present in an amount ranging between 20 and 40 parts by weight per 100 parts by weight of said monomeric component.

7. The improvement defined in claim 4 wherein said organoperoxide activator is selected from the group which consist of cumenehydroperoxide and tertiary-butylhydroperoxide.

8. The improvement defined in claim 7 wherein said organoboron catalyst is selected from the group which consists of triethylboron, tripropylboron and tributylboron.

9. The improvement defined in claim 8 wherein said organoboron catalyst is complexed with an organic ether selected from the group which consists of dimethyl ether, diethyl ether, dioxane, and tetrahydrofurane.

10. The improvement defined in claim 4 wherein the polymerization reaction in each of said stages is carried out at a temperature between $-20°$ and $-60°$ C.

References Cited

UNITED STATES PATENTS 3,275,611  9/1966  Mottus, et al. _____ 260—92.8

FOREIGN PATENTS 894,767  4/1962  Great Britain.
961,254  6/1964  Great Britain.
2,599,564  9/1962  Japan.

JOSEPH L. SCHOFER, Primary Examiner

J. A. DONAHUE, JR., Assistant Examiner

U.S. Cl. X.R.

260—86.3, 87.5